(12) United States Patent
Sautter et al.

(10) Patent No.: US 7,936,198 B2
(45) Date of Patent: May 3, 2011

(54) PROGAMABLE CONTROL CLOCK CIRCUIT FOR ARRAYS

(75) Inventors: Rolf Sautter, Bondorf (DE); Michael Ju Hyeok Lee, Austin, TX (US); Yuen Hung Chan, Poughkeepsie, NY (US); Juergen Pille, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 12/345,758

(22) Filed: Dec. 30, 2008

(65) Prior Publication Data
US 2010/0164586 A1 Jul. 1, 2010

(51) Int. Cl.
*H03K 3/00* (2006.01)

(52) U.S. Cl. .......... 327/291; 327/298; 327/172; 327/176

(58) Field of Classification Search .......... 327/172–176, 327/144–150, 156–159, 291, 294, 298, 299
See application file for complete search history.

(56) References Cited

U.S. PATENT DOCUMENTS

| | | | |
|---|---|---|---|
| 6,437,619 B2 * | 8/2002 | Okuda et al. | 327/158 |
| 7,319,728 B2 * | 1/2008 | Bell et al. | 375/354 |
| 2007/0182470 A1 * | 8/2007 | Heyne | 327/158 |

* cited by examiner

*Primary Examiner* — An T Luu
(74) *Attorney, Agent, or Firm* — Cantor Colburn LLP; Justin Dillon

(57) ABSTRACT

A programmable clock control circuit includes a base block, a chop block, and a pulse width variation block coupled between the chop block and the base block that receives the chop block output and provides a pulse width variation output to the base block. The pulse width variation block is programmable to vary the chop block output to provide at least three different output pulse widths. The circuit also includes a clock delay block coupled an output of the base block to delay the output pulse and having a clock signal output.

16 Claims, 5 Drawing Sheets

(Invention)

US 7,936,198 B2

PROGAMABLE CONTROL CLOCK CIRCUIT FOR ARRAYS

This invention was made with Government support under Contract No.: HR0011-07-9-0002 awarded by DARPA. The Government has certain rights in this invention.

BACKGROUND

The present invention relates to clock circuits, and more specifically, to clock circuits for arrays.

High performance arrays like static random access memory (SRAM) require usually clock generation circuits to control internal circuit timings. These array local clock generators (also known as Local Clock Buffers, or LCBs) usually are used to control array word decode/bit decode and read/write critical circuit function. To provide timing tuning flexibilities as well as hardware debug capabilities, state of the art array LCBs often have programmable controls on its clock delay or pulse width circuits. Multiple discrete timing settings of delay or pulse width are implemented with explicit decoders and with typical inverter delay chains. Such programmability of timing settings of delay or pulse width however adds circuit complexity, chip area and power consumption to the LCB structures. A state of the art local clock control buffer is constructed with modular circuit blocks. This modular topology makes the design extremely flexible to drive different clock loads and latch types.

However, due to the constraints of timing programmability, the ability to shift and delay the launching clock of LCB is limited. For array control designs pulsed clocks are typically needed. Since the pulsed clocks are not changing with frequency, several programmable setting are required to allow for pulse width modulation (PWM) for timing adjustments and for debugging.

SUMMARY

According to one embodiment of the present invention, TO BE COMPLETED WHEN CLAIMS FINALIZED . . . .

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments of the present invention are directed to an array clock control circuit structure having significantly more programming features for the pulse width of the launch clock. Embodiments may be built with similar modular topology as the state of the art implementation and reuses as much as possible circuit sub-blocks. It consists of blocks of circuit elements to provide various clock control function. Included in these blocks are a BASE-block for LCB input control and a LCLK-Delay clock for providing programmable clock delay control. Additional programmable clock delay control circuit uses two mode bits to provide three delay settings. The 2-to-3 decode function is combined with the delay chains. The delay chains are configured with a modulated PFET/NFET inverter structure instead of simple inverter chains.

Figure 1:
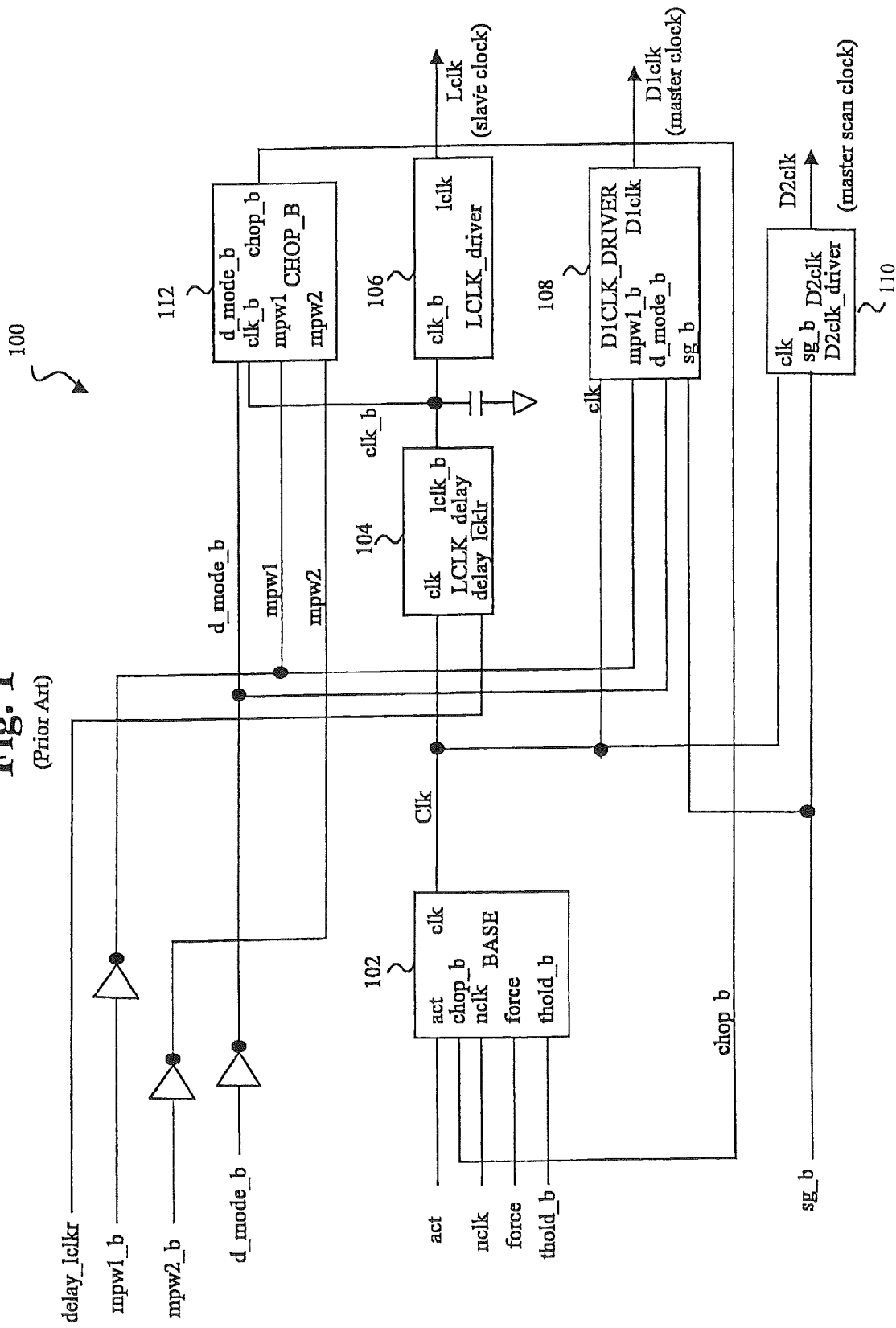
FIG. 1 shows a prior art clock control circuit.

FIG. 1 shows an example of a prior art local control buffer 100. The local clock buffer 100 is constructed with modular circuits described below. The modular topology makes the design extremely flexible to drive different clock loads and latch types (ll, nlat, elat . . ).

The local clock buffer 100 receives the following input signals: nclk which is the negative active global clock signal; sg_b or scan gate, which determines the input to a latch of the array and may determine if the latch receives data is available for scanning; act which is an activate command that in the functional mode, local clock is inactive unless activated with "act"; force which forces a pin override of the act control for scan purposes; tholb_b which at the thold_b pin is the complement of the test hold signal. This is an global gating control and overrides act and sg pin. The local clock buffer also receives the following signals: d_mode which is a control to disable pulse mode; mpw1_b and mpw2_b which vary the clock pulse width for test purpose and delay_lclkr which is a control to delay the rising edge of the launch clock (lclk). Lclk is the main output of the local clock buffer 100.

The local clock buffer 100 includes base block 102. The base block 102 is the basic/functional control circuitry of the LCB 100. It is driven from the nclk=negative clock signal. It has an integrated latch function to capture the act, force, and thold_b signals. The circuitry has a feedback input called "chop_b" that controls the pulsed clock behavior of the output signal "clk."

The LCB 100 also includes a clock delay block 104 that receives the clk signal from the base block 102 and the delay_lclkr signal. The clock delay block 104 provides a delayed clock signal lclk_b to the clock driver 106. This block allow for 1.5FO4 of delay to the launch clock when the delay signal "delay_lclkr" is active. The clock driver 106 serves as an output driver circuit of the local clock buffer and drives the slave clock load via output signal "lclk".

The LCB 100 also includes a secondary clock block 108 that is coupled to the pulse internal net "clk" and is only active when d_mode_b is high. The control signal mpw1_b vary the clock pulse width by −0.5FO4 for test purpose. The secondary clock block also receives the control signal sg_b to turn off the masterclock in scan mode. It drives the master clock loads via signal "d1clk".

The LCB 100 also includes a third clock driver 110 that accept control sg_b to turn on for scan mode and drives the master clock loads via signal "d2clk".

The LCB 100 also includes a chop_B block 112. This block controls pulse width by sending chop_b signal back to the base block 102. This block also receives signals mpw1, mpw2 to widen or narrow pulse width by +/−0.5FO4 and is only operative when d_mode_b is high.

Figure 2:
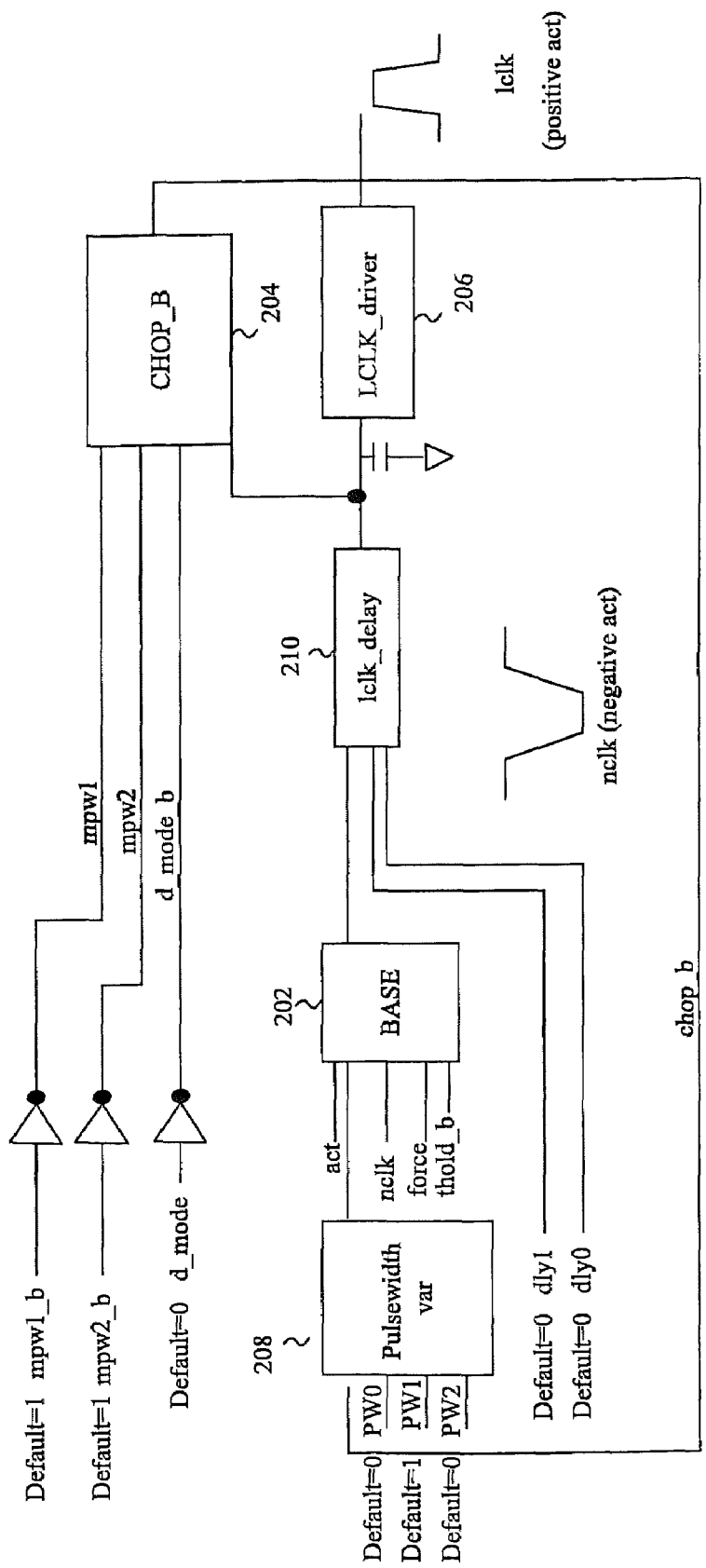
FIG. 2 shows a clock control circuit according to one embodiment of the present invention.

One embodiment of the present invention is shown in FIG. 2. Compared to the prior clock control buffer, the new array clock control circuit structure of the present invention may include more programming features for the pulse width of the launch clock. It also has one additional delay adjustment for the launch clock. It is built with the similar modular topology as the state of the art implementation and reuses many of the prior art circuit sub blocks.

In one embodiment, the circuit shown in FIG. 2 may be used to drive P7 and Z7 arrays. As discussed above, the circuit includes many standard sub blocks such as, for example, a base block 202 and a chop_b block 204 and a lclk_driver block 206.

In particular, the base block 202 receives an act signal, an nclk signal, a force signal, and a thold_b signal as in the prior art implementation. The base block 202 also receives a signal from a pulse width variation block 208. In general, the base block 202 serves the same function as in the state of the art implementation. This is a big advantage for the overall design methodology because both versions are implemented in the same design environment.

The output of the base block 202 is coupled to the lclk_delay block 210. This block provides programmable clock delay control of the present invention. The lclk_delay block 210 in one embodiment, is programmable and includes 3 delay settings. In particular, the lclk_delay block 210 uses 2 mode bits (dly0-dly1) to provide 3 delay settings (default, 1 notch delay, 2 notch delay). The 2-to-3 decode function is combined with the delay chains in the lclk_block 210 (as described below). In one embodiment, the delay chains are configured with modulated PFET/NFET inverter structure instead of simple inverter chains.

The output of the lclk_delay block 210 is coupled to both the lclk_driver 206 and the base chop_b block 204. As described above, the lclk_driver block 206 creates an output clock signal to an array. In one embodiment, the lclk_driver block 206 may be implemented as a parameterized inverter block to adapt the LCB to the particular clock net.

The chop_b block 204 is provided for clock chopper control and controls pulse width by sending "chop_b" signal back to the pulse width variation block 208. In one embodiment, the chop_b block 204 may accept input signals mpw1 and mpw2 to widen or narrow pulse width by *+/−0.5FO4. In one embodiment, the chop_b block 204 may only be operative when the signal d_mode_b is high and has the same function as in the state of the art implementation.

In addition, the circuit of the present invention may also include a pulse width variation block 208. This block provides for programmable clock pulse width control. It is an expanded pulse width programmability implemented in the clock feedback path with 4 different pulse width settings that are used in conjunction with the existing "chop_b" control block. The four settings are controlled by the input signals, PW0, PW1 and PW2.

Figure 3:
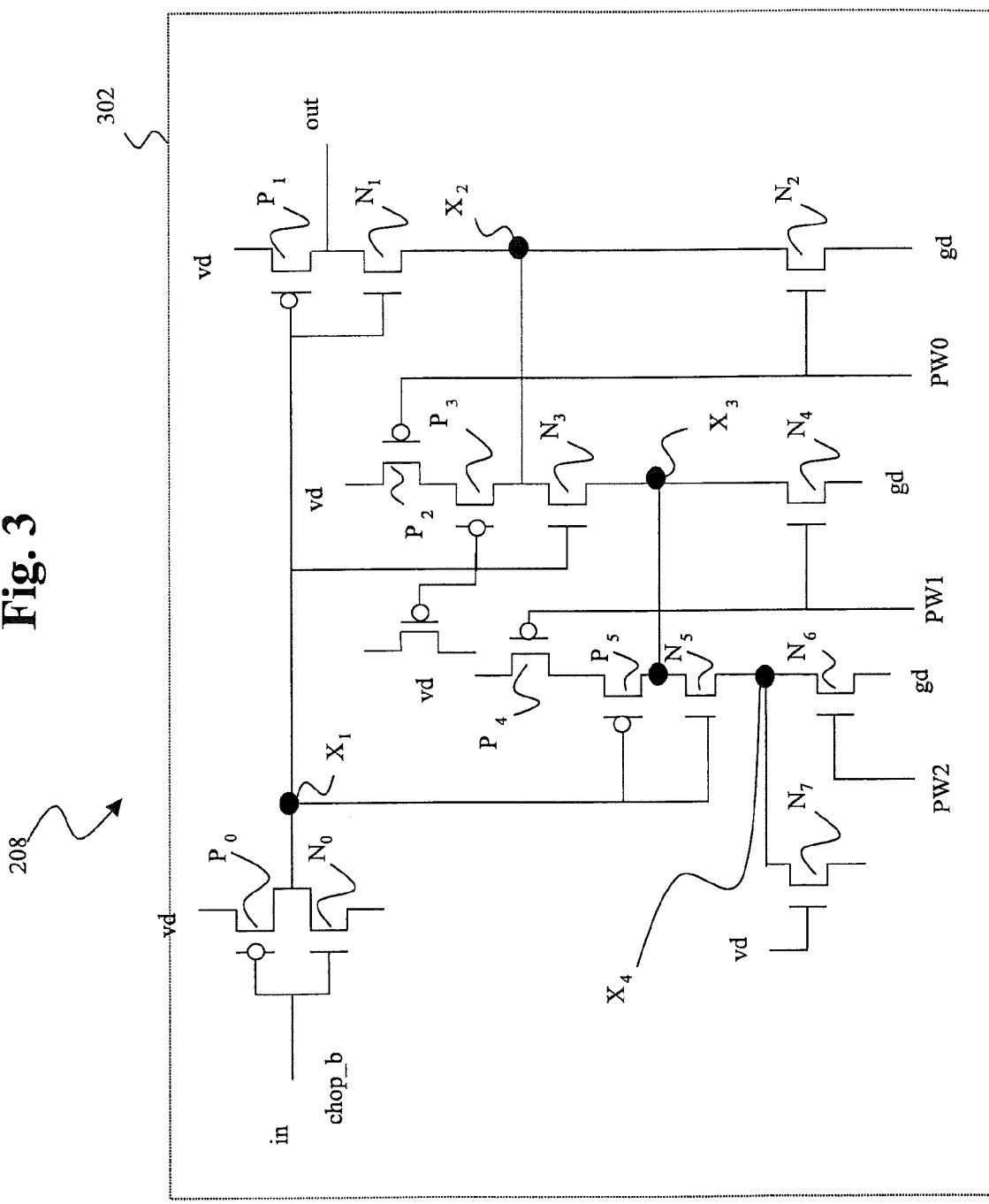
FIG. 3 shows a detailed depiction of one embodiment of a pulse width variation block according to an embodiment of the present invention.

FIG. 3 shows a more detailed depiction of a pulse width variation block 208 according to one embodiment of the present invention. The pulse width variation block 208 includes an NFET stack portion in one embodiment. As such, in this embodiment, the pulse width delay paths are generated mainly with NFET structures. The advantage of using NFET pull down rate for pulse width modulation is that its tracks better with NFET performance in the array critical timing paths. This is due to the memory cell performance being strongly dependent on the NFET pass-gate and in-board pulldown strength, and the fact that most of the critical timing paths in arrays are done using dynamic circuits for performance. These dynamic circuits also have a strong dependence on NFET strength.

In FIG. 3, the program setting determines the number of NFETs in the pulldown stack to GND; therefore, affecting the pulldown rate of signal "out". For example, if the setting is PW0=0, PW1=0, and PW2=0, then, it will pull on the 4 transistors (N1,N3,N5,N7) in the NFET stack this generate the widest pulse width. If the setting is PW0=0, PW1=0, and PW2=1, then, there would be 5 Transitors (N1,N3,N5,N6,N7) on in the NFET stack but with more effectively device strength, this generate an wide pulse width. If the setting is PW0=0, PW1=1, and PW2=0, then, there would be 3 NFETs (N1,N3,N4) on in the NFET stack. The effective nfet device strength increase again. This generate the default pulse width. If the setting is PW0=1, PW1=0, and PW2=0, then, there would be 2 NFETs (N1,N2) on in the NFET stack. This generate an small pulse width. The nfet stack variation steering the effective pulse width seen on the output signal "out"

Figure 4:
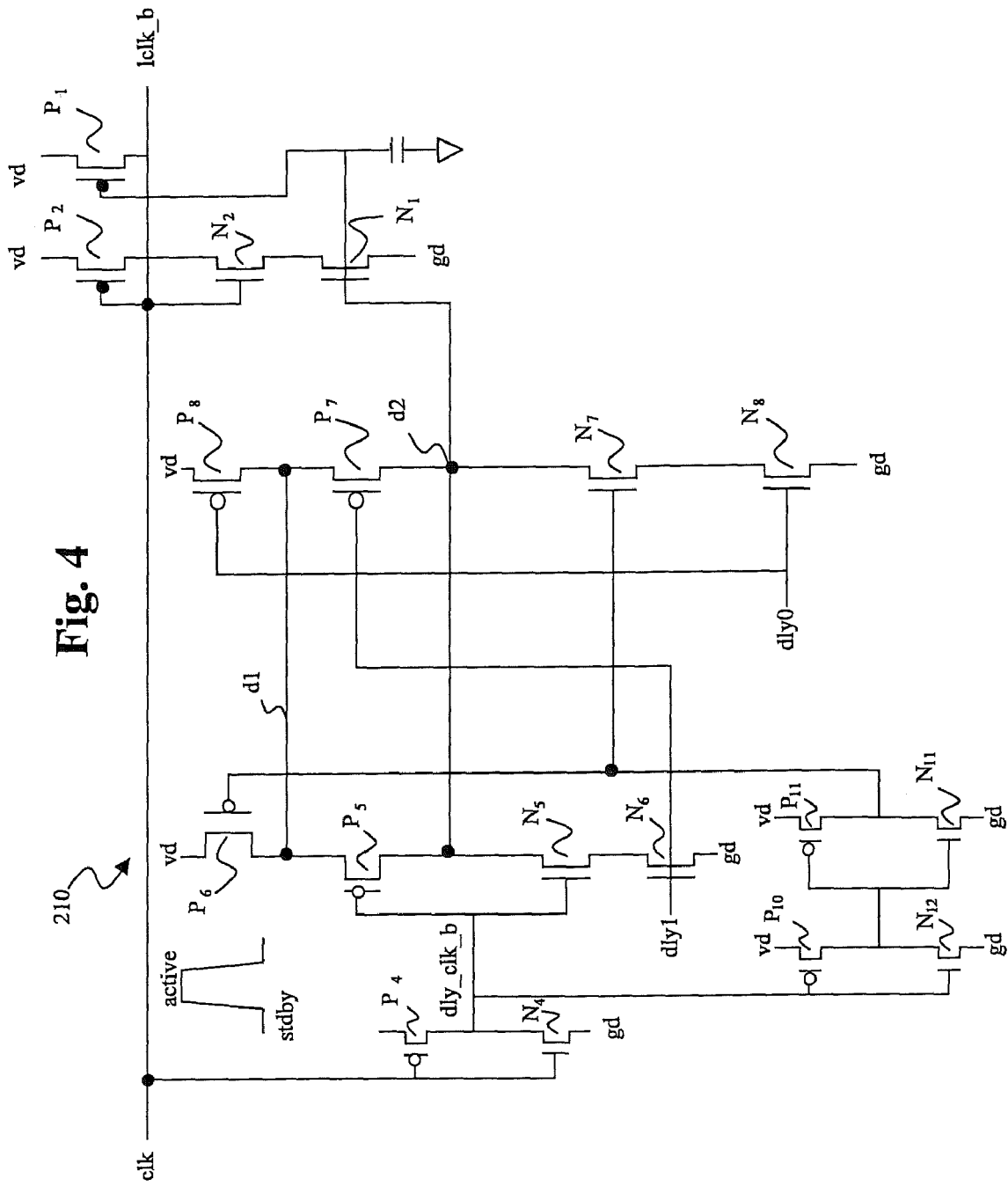
FIG. 4 shows a detailed depiction of one embodiment of a clock delay block according to an embodiment of the present invention.

FIG. 4 shows a more detailed version of an lclk_delay block 210. This block receives the signal clk (from the base block; FIG. 2) and provides an output lclk_b signal to the clck_driver block 206 (FIG. 2). The amount of delay is determined by the control signals dly1 and dly0.

In one embodiment, the lclk_delay block 210 may replace typical delay chains with modulated PFET/NFET inverter structures. The block 210 may include at least three settings based on the input signals dly0 and dly1.

In the event that both dly0 and dly1 are low (nominal setting), both P7 and P8 are DC on, pulling node d2 up to Vd. The 'clk' signal switches thru the upper inverter structure (P2/N2). Hence clock delay is only one inverter long. In the event dly0 is low and dly1 is high (1 notch delay setting) the NFET stack (N5/N6) and the PFET stack (P5/P8) are enabled. Clk switches thru N4 inverter and P5-P8 stack to pull node d2 up. Hence the clock delay is three inverters long (2 stages longer than the default setting). In the event that dly0 is high and dly1 is low, the NFET stack (N7/N8) and the PFET stack (P6/P7) are enabled. Clk switches thru P4/N4 to P10/N10 and P11/N11 inverters, then turns on P6/P7 stack to pull up node d2. Hence the clock delay is five inverters long (2 stages longer than the nominal setting).

Figure 5:
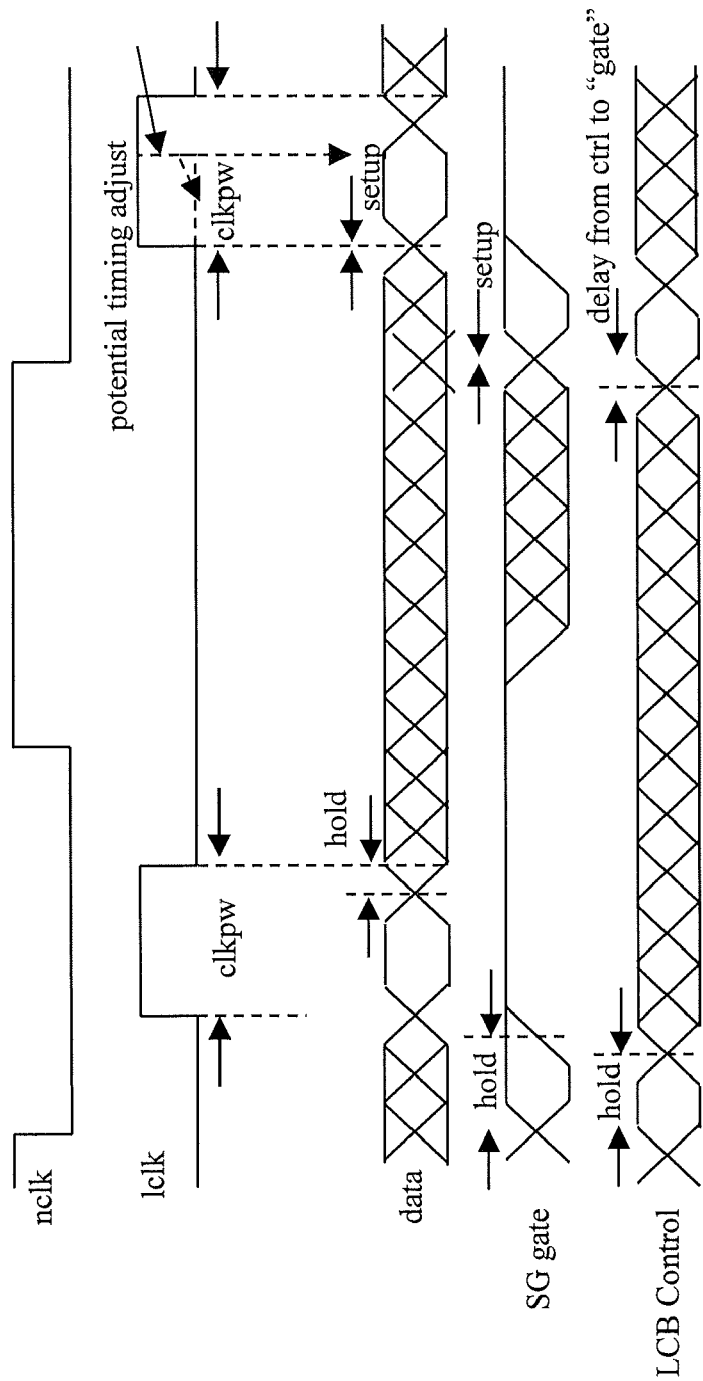
FIG. 5 shows a timing diagram of for the circuit shown in FIG. 2.

FIG. 5 shows a timing diagram for the circuit shown in FIG. 2. The falling edge of the global clock "nclk", triggers the pulsed clock "lclk". The lclk pulse width is defined with the pulse width variation block but is also triggered from the falling edge of the global clock signal nclk. The array input data have a setup time requirement to the rising edge of the pulsed 'lclk' and have a hold time requirement to the falling edge of the 'lclk'. The lcb control signal's have a setup time requirement to the falling edge of the global clock 'nclk' and hold time requirement to the falling 'nclk'. The sg gate signal (scan gate signal) which has the same setup and hold time requirement's as the lcb control signals. The sg gate input are not used as in the state of the art approach to set the lcb in scan or normal system mode. The sg pin is renamed to 'force' in some embodiments of the present invention. The force pin is an global Signal to force the local clock buffer on or off. It overrides the local act control pin for scan purposes.

The advantages of this approach over the state of the art approach are several. They may include, but are not limited to: the launch clock pulse has more programmability to provide a wider pulse width range. This may be essential for array internal timing applications; the launch clock pulse has two delay adjustments for added timing flexibility; the clock control circuit has modular structures as well for the delay lclk and pulse width variation sub block; the new array clock control circuit still has the same basic function as the state of the art design. This may allow for common chip design flow.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A programmable clock control circuit, the circuit comprising:
    a base block configured to control operation of the programmable clock control circuit and coupled to a negative clock signal;
    a chop block configured to control the width of an output clock signal of the programmable clock control circuit and having a chop block output;
    a pulse width variation block coupled between the chop block and the base block, the pulse width variation block receiving the chop block output and providing a pulse width variation output to the base block, the pulse width variation being programmable to vary the chop block output to provide at least three different output pulse widths;
    a clock delay block coupled an output of the base block to delay the output pulse and having a clock signal output; and
    a clock driver circuit coupled to the clock delay block and configured to receive the clock signal output and to produce the output clock signal.
2. The circuit of claim 1, wherein the pulse width variation block includes three control inputs.
3. The circuit of claim 2, wherein the control inputs control the operation of the pulse width variation block to alter the chop block output.
4. The circuit of claim 2, wherein the pulse width variation block comprises:
    an NFET stack coupled to the three control inputs.
5. The circuit of claim 4, wherein each control input is coupled, at least in part, to the NFET stack through an NFET.
6. The circuit of claim 1, wherein the clock delay block includes at least three different delay settings.
7. The circuit of claim 6, wherein the clock delay block includes two delay control inputs.
8. The circuit of claim 6, wherein the clock delay block includes a plurality of delay structures.
9. The circuit of claim 6, wherein in the event that a first of the delay control inputs is low and the second of the delay control inputs is low, a first delay structure delays the output pulse a first delay amount.
10. The circuit of claim 9, wherein in the event that a first of the delay control inputs is low and the second of the delay control inputs is high, the first delay structure and a second delay structure delay the output pulse a second delay amount greater than the first delay amount.
11. The circuit of claim 10, wherein in the event that a first of the delay control inputs is high, the first delay structure, the second delay structure delay and a third delay structure delay the output pulse a third delay amount greater than the second delay amount.
12. The circuit of claim 11, wherein the first delay structure includes one inverter, the second delay structure includes three inverters and the third delay structure includes five inverters.
13. The circuit of claim 12, wherein one or more of the more of the inverters is formed by an NFET/PFET pair.
14. A programmable clock control circuit, the circuit comprising:
    a clock driver circuit configured to provide an output clock signal;
    a base block configured to control operation of the programmable clock control circuit; and
    a clock delay block between the base block and the clock driver circuit configured to receive a clocking signal from the base block and delay it an adjustable amount before the signal is transmitted to the clock driver circuit, the clock delay block including two delay control inputs;
    wherein the clock delay block includes a plurality of delay structures;
    wherein, in the event that a first of the delay control inputs is low and the second of the delay control inputs is low, a first delay structure delays the output pulse a first delay amount, in the event that a first of the delay control inputs is low and the second of the delay control inputs is high, the first delay structure and a second delay structure delay the output pulse a second delay amount greater than the first delay amount, and in the event that a first of the delay control inputs is high, the first delay structure, the second delay structure delay and a third delay structure delay the output pulse a third delay amount greater than the second delay amount.
15. The circuit of claim 14, wherein the first delay structure includes one inverter, the second delay structure includes three inverters and the third delay structure includes five inverters.
16. The circuit of claim 15, wherein one or more of the more of the inverters is formed by an NFET/PFET pair.

* * * * *